United States Patent [19]

Okamoto et al.

[11] Patent Number: 4,777,717
[45] Date of Patent: Oct. 18, 1988

[54] METHOD FOR MANUFACTURING A MAGNET-TYPE MOTOR YOKE ASSEMBLY

[75] Inventors: Kyoichi Okamoto; Tadami Kounou, both of Himeji, Japan

[73] Assignee: Mitsubishi Denki Kabushiki Kaisha, Japan

[21] Appl. No.: 29,611

[22] Filed: Mar. 24, 1987

[30] Foreign Application Priority Data

Mar. 24, 1986 [JP] Japan .................. 61-66150

[51] Int. Cl.⁴ ............................ H02K 15/02
[52] U.S. Cl. ........................ 29/596; 72/393; 310/42; 310/154
[58] Field of Search ............. 29/598, 596; 72/393; 310/42, 154, 155

[56] References Cited

U.S. PATENT DOCUMENTS

| | | | |
|---|---|---|---|
| 2,461,565 | 2/1949 | Morrill | 72/393 |
| 4,454,437 | 6/1984 | Tanaka et al. | 310/83 |
| 4,525,632 | 6/1985 | Tanaka | 290/39 R |
| 4,636,107 | 1/1987 | Casler et al. | 310/154 X |

FOREIGN PATENT DOCUMENTS 1277876  6/1972  United Kingdom .

*Primary Examiner*—Carl E. Hall
*Attorney, Agent, or Firm*—Leydig, Voit & Mayer

[57] ABSTRACT

A method for manufacturing a hollow cylindrical magnetic yoke assembly for a magnet-type electric motor, including a plurality of permanent magnets attached to the inner peripheral surface of the yoke. The method comprises the steps of expanding a hollow cylindrical tube of a magnetic material by an expander having a plurality of expander elements capable of being moved radially outwards to expand the radius of the tube. The number of the expander elements is equal to the number of the permanent magnets of the electric motor, and one permanent magnet is fitted to each concaved surface of the magnetic yoke formed by the convexed cylindrical outer surface of each expander element.

1 Claim, 2 Drawing Sheets

METHOD FOR MANUFACTURING A MAGNET-TYPE MOTOR YOKE ASSEMBLY

BACKGROUND OF THE INVENTION

This invention relates to a method for manufacturing a magnetic yoke assembly for a magnet-type electric motor including a hollow cylindrical magnetic yoke and a plurality of permanent magnets attached to the inner peripheral surface of the yoke. Such motor can be used as a starter motor for an internal combustion engine, for example.

FIGS. 1 and 2 illustrate one example of a typical magnet-type starter motor for an internal combustion engine including a magnetic yoke assembly which can be manufactured by the manufacturing method of the present invention. The magnet-type motor 10 comprises a hollow cylindrical magnetic yoke assembly 11 which also serves as a housing for the motor 10. As seen from FIG. 2, which is a cross sectional view taken along the line II—II of FIG. 1, the magnetic yoke assembly 11 comprises a magnetic yoke 12 which is provided on its inner peripheral surface 14 with a plurality of field permanent magnets 16 attached at equal intervals thereto. In the illustrated example, there are six field magnets 16. The magnetic yoke 12 which is closed at one end by a cup-shaped member 18 also supports therein an armature 20 having a commutator assembly 22 and brush assemblies 24. The motor 10 is connected to an overrunning clutch 26 which in turn is connected to a pinion 28 which is axially slidable between an engaged position in which the pinion 28 engages a ring gear (not shown) of the engine and a disengaged position in which the pinion 28 disengages from the ring gear (not shown). In order to axially slide the pinion 28 between the engaged and disengaged positions, the electromagnetic switch 30 which rocks a drive lever 32 about a fulcrum 34 to slidably move the pinion 28 is provided.

The magnetic yoke 12 is manufactured from a hollows cylindrical tube 40 (FIG. 3) of a magnetic material. During manufacture of the cylindrical magnetic yoke 12, it is necessary to expand the diameter of the magnetic yoke 12 in order to precisely attach the field permanent magnets 16 on the inner peripheral surface of the magnetic yoke 12. This expanding is achieved as illustrated in FIG. 3 by first applying a sliding sheet 42 on the inner peripheral surface of the cylindrical tube 40, and then inserting a tube expander 44 into the tube 40. The tube expander 44 has a plurality of expander elements 46 capable of being moved radially outwards by a hydraulic pressure for example to expand the radius of the tube 40. Then, each of the expander elements 46 are moved radially outwards moved by the hydraulic pressure to plastically deform the tube 40, as shown in FIG. 2, in accordance with the configuration of the convexed cylindrical surfaces of the expander elements 46 to form a plurality of cylindrical concaved surfaces 48 separated by axially extending ridges 50 in the inner peripheral surface of the tube 40. Therefore, the number of the concaved surfaces 48 thus formed is equal to the number of the expander elements 46 used.

According to the conventional method, the tube expander 44 used is a commercially available expander which is provided with eight expander elements 45 as shown in FIG. 3, and no attention is paid to the relationship between the number of the expander elements 46 (typically eight) and the number of the permanent magnets 16 (typically six) to be attached to the inner surface of the magnetic yoke 12. This is quite natural because the purpose of using the expander is to expand the inner diameter of the tube to a precise desired dimension.

After the tube 40 has been expanded, the permanent magnets 16 are secured to the expanded inner surface of the tube 40 as shown in FIG. 2. However, since the number of the cylindrical recesses 48 formed by the expander elements 46 is eight and the number of the permanent magnets 16 to be attached is six, the outer cylindrical surface 54 of the permanent magnets 16 do not properly fit in a surface-to-surface relationship to the inner surface of the tube 40 and small gaps or clearances 52 are formed between the recesses 48 of the tube 40 and the other surfaces 54 of the permanent magnets 16 as illustrated in a somewhat exaggerated manner in FIG. 2. It is also seen from FIG. 3 that the permanent magnets 16 are in contact with the tube 40 only at the ridges 50 between the recesses 48, resulting in a poor magnetic coupling between them. Therefore, according to the conventional manufacturing process, the permanent magnets 16 must be pressed against the inner surface of the tube 40 with a large force, which sometimes causes damages such as cracks to the permanent magnets 16.

SUMMARY OF THE INVENTION

Accordingly, an object of the present invention is to provide a process for manufacturing a magnetic yoke assembly for a magnet-type motor capable of manufacturing a magnetic yoke assembly with a relatively simple process.

Another object of the present invention is to provide a process for manufacturing a magnetic yoke assembly capable of eliminating the possibility of damaging the permanent magnets during manufacture.

A further object of the present invention is to provide a process for manufacturing a magnetic yoke assembly capable of establishing a good magnetic coupling between the magnetic yoke and the permanent magnets.

With the above objects in view, a method for manufacturing a hollow cylindrical magnetic yoke assembly for a magnet-type electric motor including a plurality of permanent magnets attached to the inner peripheral surface of the yoke is provided. The method comprises the steps of expanding a hollow cylindrical tube of a magnetic material by an expander having a plurality of expander elements capable of being moved radially outwards to expand the radius of the tube. The number of the expander elements is equal to the number of the permanent magnets of the electric motor, and one permanent magnet is fitted to each of several concaved surfaces of the magnetic yoke which is formed by the convexed cylindrical outer surface of the respective expander elements.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
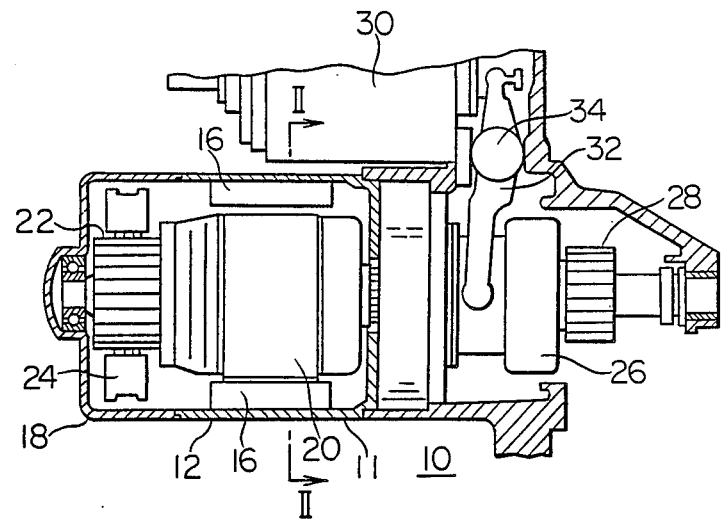
FIG. 1 is a sectional view showing a magnet-type starter motor including a magnetic yoke assembly which can be manufactured by the present invention.
Figure 2:
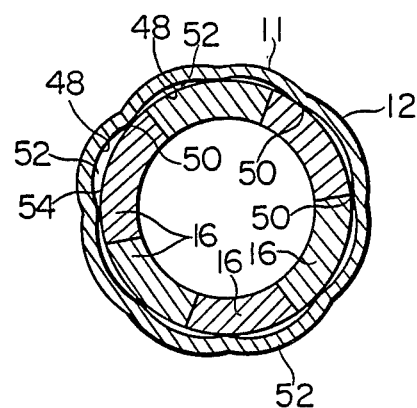
FIG. 2 is a sectional schematic view showing a magnetic yoke assembly manufactured by the conventional method in which gaps shown in exaggerated fashion are formed between the permanent magnets and the magnetic yoke.
Figure 3:
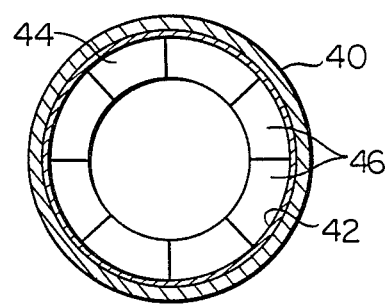
FIG. 3 is a sectional view showing one step of the conventional method for manufacturing a magnetic yoke assembly in which a tube expander is inserted into the tube.
Figure 4:
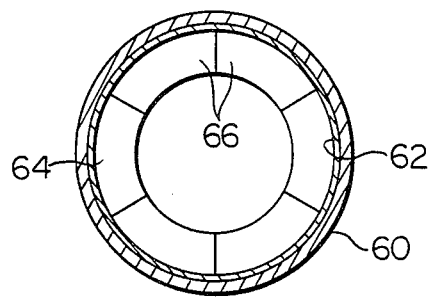
FIG. 4 is a sectional schematic view of the tube during expanding by a tube expander.
Figure 5:
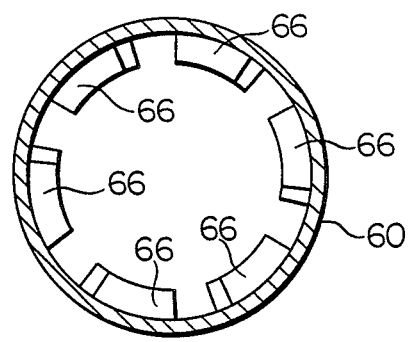
FIG. 5 is a cross-sectional view showing the manufacturing method of the present invention in which a tube expander with six expanding elements is inserted into the tube.
Figure 6:
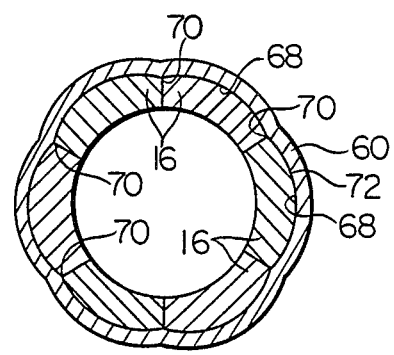
FIG. 6 is a schematic cross-sectional view of the magnetic yoke assembly manufactured according to the present invention.

Referring now to FIGS. 4 to 6 in which steps of the manufacturing method of the present invention are illustrated, a hollow cylindrical tube 60 of a magnetic material is first prepared and a sliding sheet 62 is placed on the inner peripheral surface of the cylindrical tube 60, and then a tube expander 64 is inserted into the tube 60. The tube expander 64 has a plurality of expander elements 66 capable of being radially outwardly moved by a hydraulic pressure for example to expand the radius of the tube 60. Then, each of the expander elements 66 is radially outwardly moved as shown in FIG. 5 by the hydraulic pressure to plastically deform the tube 60 according to the configuration of convexed cylindrical surfaces of the expander elements 66 to form cylindrical concaved surfaces 68 separated by axially extending ridges 70 in the inner peripheral surface of the tube 60. Therefore, the number of the concaved surfaces 68 thus formed is equal to the number of the expander elements 66.

After the tube 60 has been expanded to a desired precise inner diameter, the permanent magnets 16 are secured to the expanded inner surface of the tube 60 as shown in FIG. 6 to form a magnetic yoke assembly.

According to the manufacturing method of the present invention, the tube expander 64 used is provided with six expander elements 66 as shown in FIG. 4, and the number (six) of the expander elements 66 is equal to the number (six) of the permanent magnets 16 to be attached to the inner surface of the magnetic yoke 60.

According to this invention, since the number of cylindrical recesses 68 formed by the expander elements 66 is six and the number of the permanent magnets 16 to be attached is also six, the outer cylindrical surfaces 72 of the permanent magnets 16 properly fit to the cylindrical recesses of the tube 60, and no clearances are formed between the recesses 68 of the tube 60 and the outer surfaces 72 of the permanent magnets 16 as illustrated in somewhat exaggerated manner in FIG. 6. FIG. 6 also shows that the permanent magnets 16 are in intimate contact with the tube 60 over the entire surface of the recesses 68, resulting in a superior magnetic coupling between them. Therefore, according to the manufacturing process of the present invention, unlike the conventional method, the permanent magnets 16 are not required to be pressed against the inner surface of the tube 60, which sometimes causes damages such as cracks to the permanent magnets 16.

While the description has been made in terms of the tube expanding operation utilizing the sliding sheet, the sliding sheet may be replaced with a lubricating film or a lubricating agent.

What is claimed is:

1. A method for manufacturing a yoke assembly of a magnet-type electric motor, including a hollow cylindrical magnetic yoke having a plurality of permanent magnets attached to the inner peripheral surface thereof, comprising the steps of:
    preparing a hollow cylindrical tube of a magnetic material, said hollow cylindrical tube having an inner surface;
    inserting a tube expander having a plurality of expander elements capable of being moved radially outwards to expand the radius of said tube, the number of said expander elements being equal to the number of permanent magnets of the electric motor, each of said expander elements having a convex cylindrical outer surface;
    moving said expander elements radially outwardly to plastically deform said tube, said expander elements forming, when expanded, cylindrical concave surfaces corresponding to said convex cylindrical outer surfaces of said expander elements separated by axially extending ridges in the inner surface of said tube; and
    attaching one of said permanent magnets to each of said concave surfaces in the inner surface of said tube.

* * * * *